United States Patent [19]

Chaplin

[11] Patent Number: 4,811,102
[45] Date of Patent: Mar. 7, 1989

[54] HYBRID WIPE GENERATOR

[75] Inventor: Daniel J. Chaplin, Nevada City, Calif.

[73] Assignee: The Grass Valley Group, Inc., Grass Valley, Calif.

[21] Appl. No.: 30,936

[22] Filed: Mar. 26, 1987

[51] Int. Cl.[4] .......................................... H04N 5/272
[52] U.S. Cl. .................................... 358/183; 358/182
[58] Field of Search ................ 358/183, 182, 181, 22; 178/15, 30

[56] References Cited

U.S. PATENT DOCUMENTS

| | | | |
|---|---|---|---|
| 3,810,166 | 5/1974 | Atkin | 340/743 X |
| 4,081,604 | 3/1978 | Kanaiwa | 178/15 X |
| 4,218,711 | 8/1980 | Kashigi | 358/183 |
| 4,451,840 | 5/1984 | Shanley, II | 358/183 X |
| 4,477,830 | 10/1984 | Lindman et al. | 358/183 X |
| 4,496,976 | 1/1985 | Swanson et al. | 358/183 X |
| 4,633,297 | 12/1986 | Skevlos et al. | 358/22 |
| 4,639,765 | 1/1987 | D'Hont | 358/22 X |
| 4,644,401 | 2/1987 | Gaskins | 358/183 |
| 4,675,736 | 6/1987 | Lehmer et al. | 358/183 |
| 4,736,240 | 4/1988 | Samuels | 358/22 X |

Primary Examiner—James J. Groody
Assistant Examiner—E. Anne Faris
Attorney, Agent, or Firm—John Smith-Hill; Francis I. Gray

[57] ABSTRACT

Video special effects apparatus comprises both an analog pattern generator and a digital pattern generator. The analog control signal generated by the analog pattern generator and the digital control signal generated by the digital pattern generator are combined to provide a hybrid control signal, and the hybrid control signal is used to control the wipe between two video signals.

2 Claims, 2 Drawing Sheets

HYBRID WIPE GENERATOR

This invention relates to a method and apparatus for carrying out video special effects.

BACKGROUND OF THE INVENTION

Information conveyed by a video signal may be conceived as a rectangular prism 10 of indeterminate length and of rectangular cross-section, as shown in FIG. 1. The longitudinal dimension of the prism corresponds to time, and with passing of time a reference plane 18, defining the present time, sweeps longitudinally through the prism. A simple analog wipe from a first video signal (video 1) to a second video signal (video 2) may be represented by a planar wipe surface which intersects the prism obliquely to the time axis. A horizontal analog wipe is represented by the plane 22, and a vertical analog wipe (from video 2 to video 3) is represented by the plane 26.

In the case of an analog wipe, the distance, representing time, between the reference plane 18 and the wipe surface 22 or 26 has a continuum of values.

When a digital wipe from video 1 to video 2 is carried out, the wipe surface that separates video 1 from video 2 is composed of portions which are substantially perpendicular to the reference plane 18 and portions which are substantially parallel to the reference plane. In the case of a matrix wipe, for example, the configuration of the surface portions, when the prism is viewed in longitudinal section, might be as shown in FIG. 2. When a matrix wipe is affected, the video 2 scene first appears in the video 1 scene as a few square tiles against a field of the video 1 scene. The number of tiles increases as the wipe progresses until the video 1 scene appears as a few tiles within the video 2 scene and is eventually displaced completely by the video 2 scene.

In implementation of a digital wipe or an analog wipe using a production switcher, a wipe pattern generator generates a repeating waveform which is synchronized to the video 1 and video 2 signals, and is applied to a comparator in which the voltage of the repeating waveform is compared with a reference voltage corresponding to the position of a lever arm. The output voltage provided by the comparator is applied as a control signal to a mixer which provides an output video signal having the form video out = control × video 1 (1−control) × video 2

As the lever arm sweeps from one end of its range of movement to the opposite end, the control signal causes a transition between video 1 and video 2.

SUMMARY OF THE INVENTION

A preferred embodiment of the present invention is video special effects apparatus comprising both an analog pattern generator and a digital pattern generator. The analog control signal generated by the analog pattern generator and the digital control signal generated by the digital pattern generator are combined to provide a hybrid control signal, and the hybrid control signal is used to control the wipe between two video signals.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
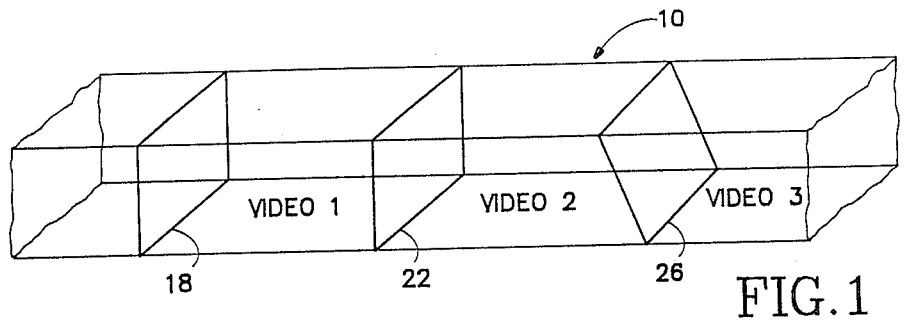
FIG. 1 is a graphical representation of the output signal provided by a video mixer.
Figure 2:
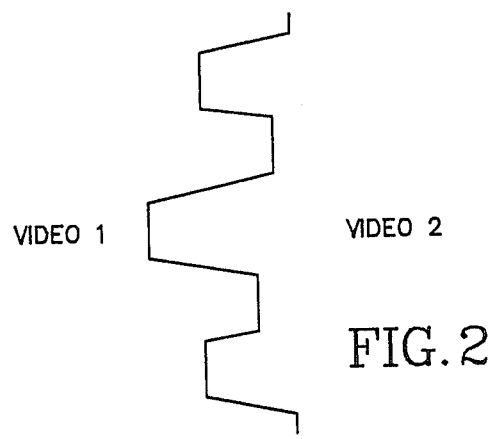
FIG. 2 is a graphical representation of a matrix wipe.

The illustrated special effects apparatus includes an analog pattern generator 100 and a digital pattern generator 110. These two pattern generators are of conventional form. The output signals provided by the pattern generators 100 and 110 are applied to respective potentiometers 102 and 104, and the wipers of the potentiometers are connected to a conventional summing network 114. The potentiometers 102 and 104 are coupled so that the contributions of the analog control signal and the digital control signal to the hybrid output signal provided by the summing network 114 vary in complementary fashion as the potentiometers are adjusted. The hybrid control signal provided by the summing network is applied to one input terminal of a comparator 120, the other input terminal of which is connected to the wiper of a potentiometer 124. The position of the wiper of the potentiometer 124 is adjustable by use of a transition lever arm (not shown). The comparator 120 has a control input terminal 128 at which it receives a gain control signal. The output signal of the comparator 120 is applied to a conventional mixer 130, which receives two video input signals and provides a video output signal.

Figures 4A, 4B, 4C:
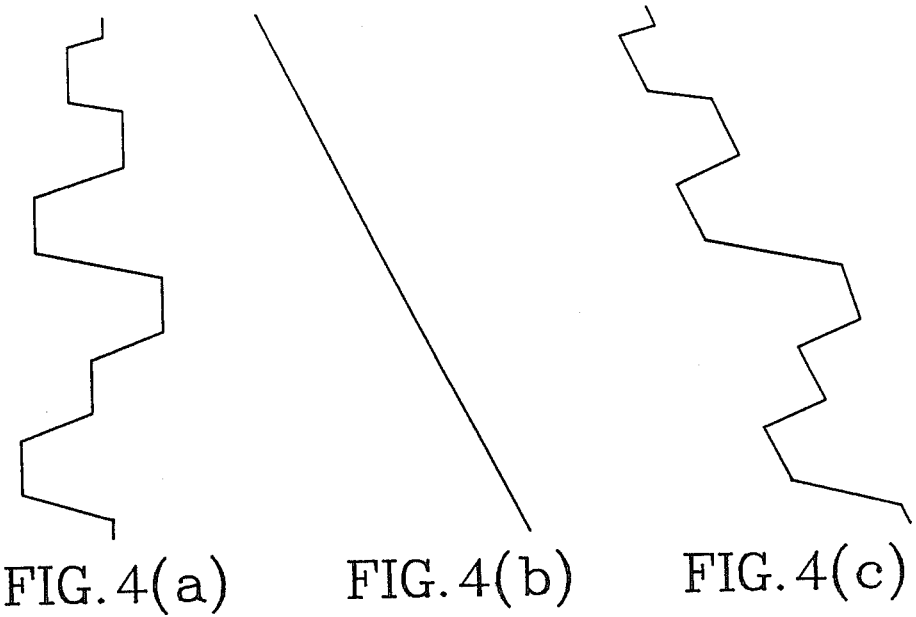
FIG. 4 illustrates the configuration of wipe volumes that can be defined.

The digital control signal provided by the digital pattern generator 110 defines a wipe surface which has the configuration shown in FIG. 4(a) when the prism 10 is viewed in longitudinal section. The pattern of portions of the scenes represented by video 1 and video 2 in the output scene comprises horizontal bars. If the bars have a 1:1 aspect ratio, they appear as square tiles. As the reference volume passes through the region in which the wipe surface lies, the bars of video 2 merge until portions of video 1 appear as bars against a video 2 field, and finally video 1 disappears.

The analog control signal provided by the analog pattern generator defines a wipe surface having the configuration shown in FIG. 4(b). The visual effect provided by this wipe surface alone is a vertical wipe from video 1 to video 2.

The wipe surface that is obtained when the analog and digital control signals contribute equally to the hybrid control signal has the configuration shown in FIG. 4(c). Thus, when the reference plane sweeps through the prism 10, the bars of the pattern defined by the digital control signal initially appear as horizontal lines and then widen, and as the transition progresses the scene represented by video 1 appears as horizontal bars against a background of the video 2 scene and the bars become narrower and ultimately disappear.

Figure 3:
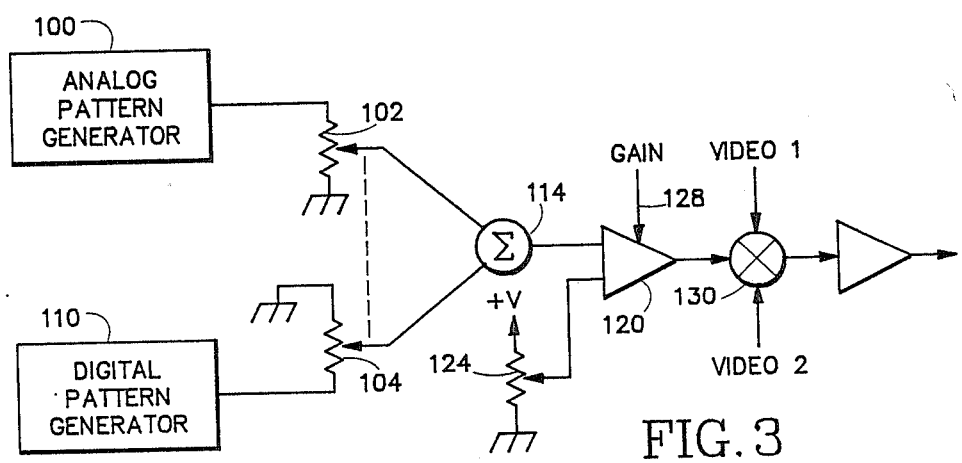
FIG. 3 is a block diagram of a special apparatus including a combination analog/digital wipe generator embodying the present invention.
Figures 5A, 5B:
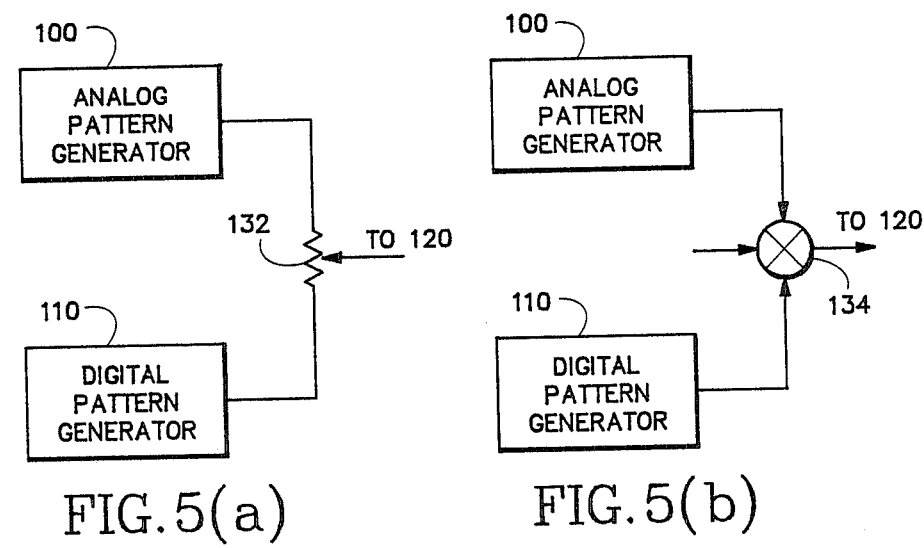
FIG. 5 illustrates modifications of the combination analog/digital wipe generator shown in FIG. 3.

It will be appreciated that the present invention is not restricted to the particular embodiment that has been described with reference to FIGS. 3 and 4, and that variations may be made therein without departing from the scope of the invention as defined in the appended claims and equivalents thereof. For example, the invention is not restricted to the digital wipe waveform providing the horizontal bars discussed with reference to FIG. 4(a), and other digital waveforms may be used instead. Similarly, the invention is not restricted to the analog wipe effect being a vertical wipe or even being a linear wipe in which the wipe surface is planar. For example, the wipe surface might be conical in form, in which case the transition between the video 1 scene and the video 2 scene occurs as a progressively enlarging disc of the video 2 scene within a field of the video 1 scene. The invention is not restricted to any particular type of summing network. The combination of the potentiometers 102 and 104 and the summing amplifier 114 may be replaced by a potentiometer connected between the output terminals of the two wipe generators and having its wiper connected to the comparator, as shown at 132 in FIG. 5(a), or the output terminals of the pattern generators 100 and 102 may themselves be applied to a mixer which receives a control signal and provides its output signal to the comparator, as shown at 134 in FIG. 5(b).

I claim:

1. Video effects apparatus comprising:
an analog pattern generator for generating an analog control signal,
a digital pattern generator for generating a digital control signal,
means for combining the analog control signal and the digital control signal to provide a hybrid control signal, and
mixer means having a first video signal input terminal for receiving a first input video signal, a second video signal input terminal for receiving a second input video signal, a control input terminal connected to receive the hybrid control signal, and an output terminal for providing an output video signal which is formed by combining the first and second input video signals in dependence upon the hybrid control signal.

2. Apparatus according to claim 1, wherein the means for combining the analog control signal and the digital control signal comprise a summing network.

* * * * *